United States Patent
McCusker

(10) Patent No.: US 7,440,591 B1
(45) Date of Patent: Oct. 21, 2008

(54) VALIDATION OF TERRAIN AND OBSTACLE DATABASES

(75) Inventor: Patrick D. McCusker, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 768 days.

(21) Appl. No.: 10/706,504

(22) Filed: Nov. 12, 2003

(51) Int. Cl.
*G06K 9/00* (2006.01)

(52) U.S. Cl. ........................... 382/109; 434/150
(58) Field of Classification Search ............... None
See application file for complete search history.

(56) References Cited

U.S. PATENT DOCUMENTS

| | | | |
|---|---|---|---|
| 6,011,505 A | * | 1/2000 | Poehler et al. ............ 342/25 C |
| 6,125,329 A | * | 9/2000 | Place et al. ..................... 702/5 |
| 6,233,522 B1 | * | 5/2001 | Morici ........................ 701/208 |
| 2002/0114509 A1 | * | 8/2002 | Takeuchi et al. ............ 382/154 |

* cited by examiner

*Primary Examiner*—Samir Ahmed
*Assistant Examiner*—Claire Wang
(74) *Attorney, Agent, or Firm*—Nathan O. Jensen

(57) ABSTRACT

A method of identifying errors in information describing terrain features is disclosed. According to the method, a first set of data is obtained which describes an area of terrain. The first set of data has a first type of error. A second set of data is obtained which describes the area of terrain. The second set of data has a second type of error. The second type of error is characteristically different from the first type of error. A subset of the first set of data corresponding to a first portion of the area of terrain is compared with a subset of the second set of data corresponding to the first portion to identify information not present in one of the first and second sets of data.

20 Claims, 4 Drawing Sheets

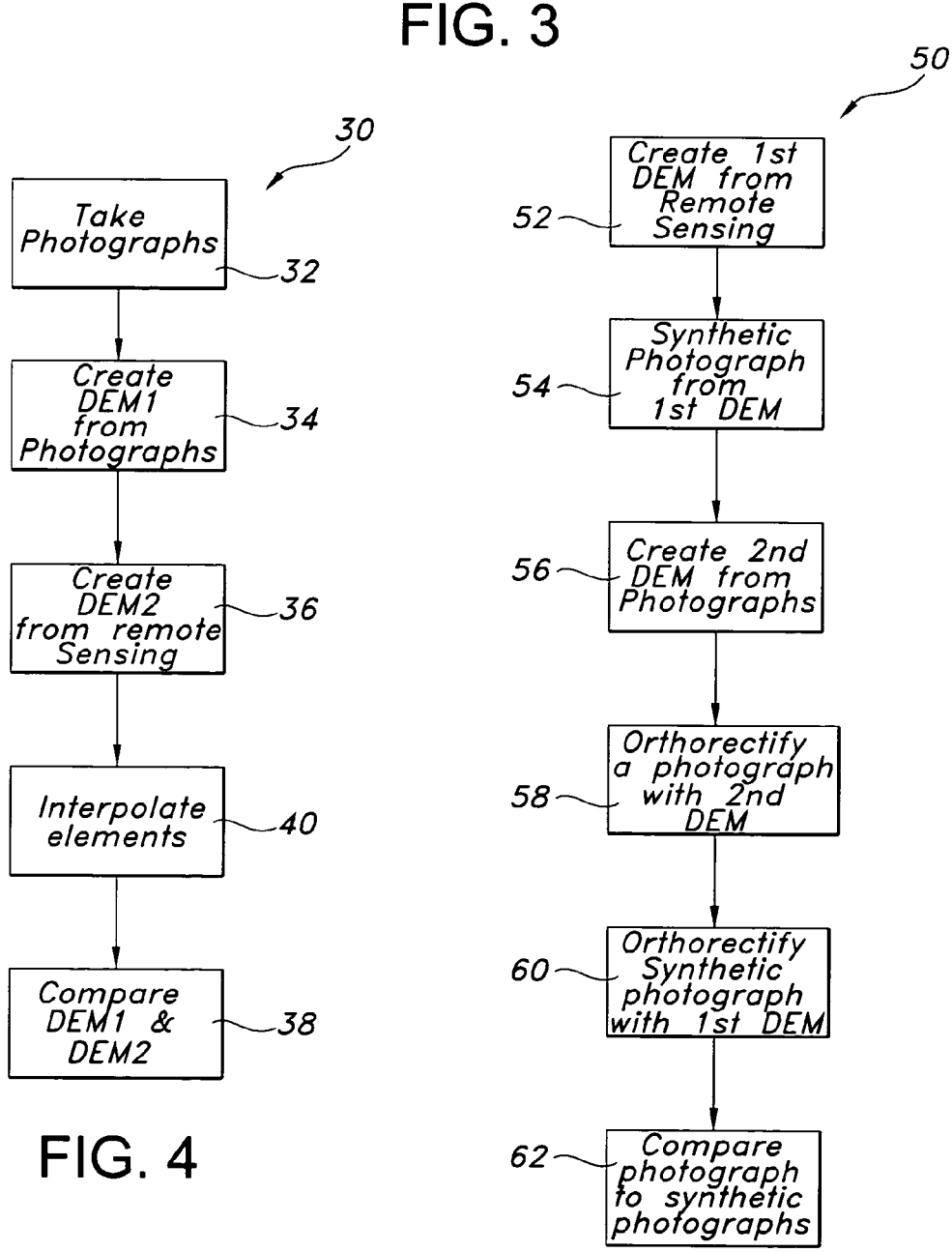

VALIDATION OF TERRAIN AND OBSTACLE DATABASES

FIELD OF THE INVENTION

The invention relates to database management, and more particularly, to the validation of databases containing terrain and obstacle information.

BACKGROUND OF THE INVENTION

Aircraft navigation has the potential of being greatly improved by the computerized rendering of terrain for a pilot. This technology, sometimes known as synthetic vision, accesses a database having information relevant to the terrain desired to be displayed. A pilot viewing a terrain rendering based upon the database can therefore view nearby terrain and obstacles even in poor visibility conditions.

The creation of terrain databases, useful for avionics applications, has typically depended upon one of two general types of technology, each with different types of errors associated therewith. To ensure the terrain database is accurate, it is important to be able to discover errors in the terrain data. The first technology is photogrammetry, which allows distances between points on the earth to be measured from distance between representations of those points in a photograph of the earth. Two-dimensional maps can be produced from a single photograph and three-dimensional Digital Elevation Models can be derived from stereo-pairs of photographs. Errors are typically introduced into the final products due to the distortion created by representing a three-dimensional spherical object (i.e. the earth) on a two-dimensional photograph.

The second technology is generally known as remote sensing which uses ranging sensors to measure the distance from a sensor to the terrain or object. Interferometric Synthetic Aperture Radar (IFSAR) and Light Detection and Ranging (LIDAR), two known technologies, are examples of remote sensing technologies useful in creating terrain databases. The remote sensor is mounted in an airborne platform (i.e. an aircraft or on a satellite) and long strips of range data are collected as the platform traverses the earth. A Digital Elevation Model (DEM) is derived from recordings of the position of the airborne platform and the range to terrain and/or obstacles from the airborne platform. The raw DEM requires substantial post-processing (e.g. to strip out buildings or vegetation) to generate a useable DEM for most applications that require terrain and obstacle data. The final DEM may contain errors that are introduced when the raw DEM is recorded and may have additional errors introduced during the post-processing of the data. There are several types of errors that can be introduced into the database during post-processing of the survey data. Rugged terrain (i.e. spikes, cliffs, ravines, etc.) can "look" like a blunder to the software that searches for blunder errors. The result is that hilltops tend to get rounded-off while valleys tend to get filled-in. Both IFSAR and LIDAR are subject to the same distortions as aerial photography (tilt and height errors). So when parallel swaths are stitched together, terrain features in the overlapping areas of the survey may appear to be in different locations in different swaths. The software that stitches the swaths together must "correct" this problem. The most significant concern is that natural terrain features may be incorrectly identified as buildings or vegetation in the surface model and may be stripped-out of the bald-earth terrain model (or vegetation and buildings are misidentified as real terrain). While there may be a low probability of this occurring, the consequences of this type of error can be significant. Since the proprietary software that performs this function may not be available for examination, an independent means must be used to discover errors in the database.

It is therefore an object of the invention to provide a method for discovering errors in a terrain and/or obstacle database.

It is another object of the invention to discover errors in a terrain and/or obstacle database method using available or easily obtainable information.

A feature of the invention is using information from one source of terrain information to discover errors in another source of terrain information.

An advantage of the invention is that significant errors in a terrain/obstacle database can be easily discovered using readily available information.

SUMMARY OF THE INVENTION

The invention provides a method of identifying errors in information describing terrain features. According to the method, a first set of data is obtained which describes an area of terrain. The first set of data has a first type of error. A second set of data is obtained which describes the area of terrain. The second set of data has a second type of error. The second type of error is characteristically different from the first type of error. A subset of the first set of data corresponding to a first portion of the area of terrain is compared with a subset of the second set of data corresponding to the first portion to identify information not present in one of the first and second sets of data.

The invention also provides a method of identifying errors in a database containing information descriptive of terrain. The information is obtained by scanning the terrain using a remote sensing technology. A data set is obtained that is descriptive of the terrain and is independent of the information in the database. The data set has a characteristic error type that is different from a characteristic error type of the remote sensing technology. The data set is compared to the information in the database. Errors in the database are identified.

The invention further provides a method of identifying errors in a database containing information descriptive of terrain. The information is obtained by scanning the terrain using a remote sensing technology. A data set is obtained using photogrammetry. The data set is descriptive of the terrain and is independent of the information in the database. The data set has a characteristic error type that is different from a characteristic error type of the remote sensing technology. The data set is compared to the information in the database. Obstacles and terrain features in the data set are identified that are not accurately represented in the information in the database.

BRIEF DESCRIPTION OF THE DRAWINGS

FIG. 3 is a schematic diagram of a system that may be used according to an embodiment of the invention.

FIG. 4 is a flowchart showing a method according to one embodiment of the invention.

FIG. 6 is a flowchart showing a method according to another embodiment of the invention.

DETAILED DESCRIPTION OF THE DRAWINGS

Figure 1:
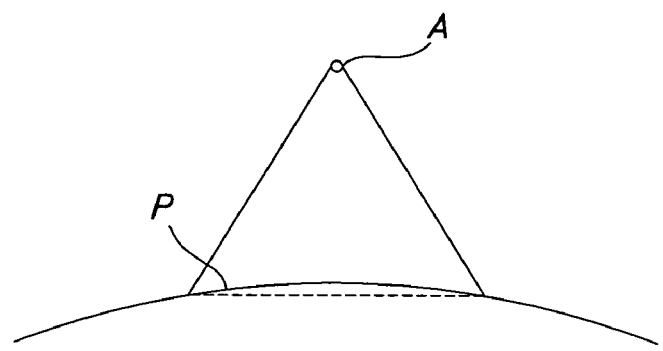
FIG. 1 is a side elevational view of a photograph being taken from an airborne or space-borne platform.
Figure 2:
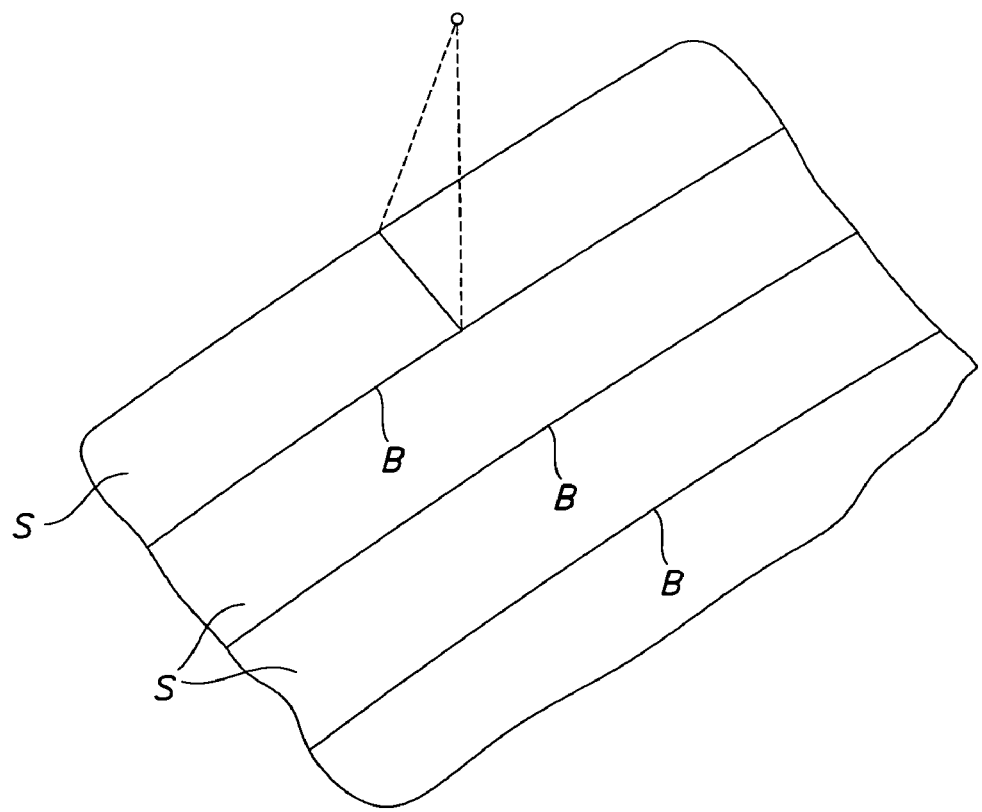
FIG. 2 is a perspective view of a series of remote sensing scans being taken from an airborne or space-borne platform.

Briefly, the invention takes advantage of two existing technologies for measuring the location and height of terrain or obstacles to validate the data obtained by the technologies. As previously discussed, two means of generating Digital Elevation Models, i.e., photogrammetry and remote sensing, have different types of characteristic errors. Photogrammetry is subject to distortion errors which are inherent to the process of taking photographs. As shown in FIG. 1, a photograph is taken at point A over a portion P of terrain. The natural curvature of the earth complicates efforts to obtain position and altitude information from the photograph. As a result, "positional"-type errors occur in a Digital Elevation Model (DEM) obtained from the photograph. Such positional-type errors may include the lateral or vertical displacement, in the database, of the latitude, longitude, and altitude of a hilltop from its true location in the real world. In contrast, remote sensing technologies such as IFSAR and LIDAR are subject to post-processing errors where terrain features or obstacles are incorrectly identified as "anomalies" by the post-processing software and are then stripped from the final DEM. As depicted in FIG. 2, such incorrect anomaly identification may especially occur in areas B where successive IFSAR or LIDAR scans S are to be stitched together. In addition, post-processing requires sophisticated algorithms which must be implemented as computer executable software. The software development process can introduce bugs into the software which can also produce other errors which may be difficult to characterize.

Because these two means of generating terrain information use fundamentally different measuring technologies and are subject to fundamentally different error characteristics, each technology can be used to identify errors in the output of the other technology. The invention compares information from the two types of technology to discover (1) significant terrain features missing from one of the databases, (2) significant non-terrain obstacles, such as high buildings and towers posing a potential flight hazard, that have been stripped from one of the data sources, and (3) extraneous terrain features or obstacles in one of the databases that do not correspond to real-world features. These types of errors are typically introduced into the database during post-processing techniques. If one of these features/obstacles is discovered present or missing (as appropriate) in one of the databases, information from the other database may be used to replace the incorrect information.

The determination of which database is more accurate for a given terrain sub-unit is principally directed by the type of characteristic error of each database. For example, significant terrain features are occasionally accidentally stripped from a database during processing of data obtained using remote-sensing techniques. In such an instance, a database obtained using photogrammetric techniques will typically be more reliable. In contrast, a database obtained using remote-sensing techniques will generally be more accurate than photogrammetry-based data with respect to precise positioning of terrain or obstacles, and any conflict between the databases on such positioning questions would likely be resolved by using the remote-sensing-based data.

FIG. 3 schematically depicts a system 10 for comparing data from two databases. A processor 12 accepts an input 14 from a camera 16 or other type of passive sensing technology. Camera 16 may be programmed to take one or more pictures of a specific area of terrain to provide a stereoscopic or parallax-type view of the area of terrain. Processor 12 also accepts an input 18 from a remote sensor 20 using LIDAR, IFSAR, or a similar technology. Sensor 20 typically scans successive strips of the area of terrain, which must then be digitally fitted or stitched together to create an integral view of the area of terrain. Processor 12 may perform this "stitching" function, or alternatively this function may be previously completed prior to input into the processor. Processor 12 processes the inputs from camera 16 and/or sensor 20 so the data from each input is in a format acceptable for comparing with one another, said format being more fully explained below. The processor looks for missing obstacles and terrain features in one or both of the data from the inputs, and based upon the error characteristics of the data, replaces or corrects errors found in one set of data with information from the other set of data. Once the processor has compared each sub-unit or frame of the two sets of data obtained from the inputs, the processor provides an output, at 22, which is a corrected or composite data set describing the area of terrain.

While comparing data from the two inputs it is likely that data describing some terrain sub-units are only slightly different. It may be desirable to ignore such slight differences if the differences have no appreciable impact on the effectiveness or safety of a user accessing the terrain database. The present invention therefore focuses more upon the discovery of errors within terrain databases rather than ensuring a high degree of accuracy of the information in the databases. The databases may require additional processing, using other algorithms, if the terrain databases are required to have a high degree of accuracy.

Figure 5:
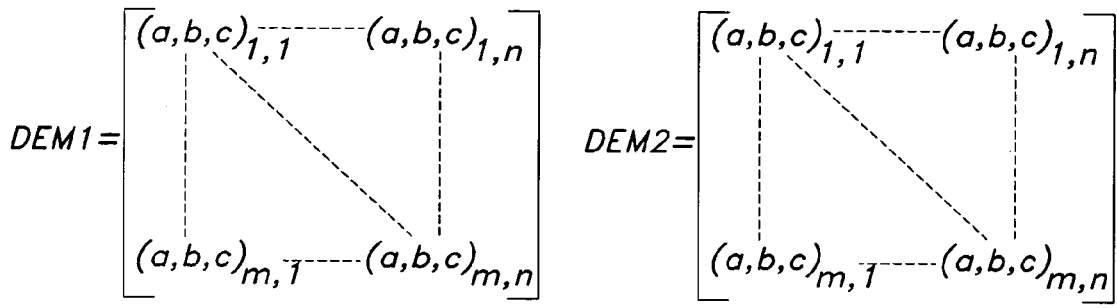
FIG. 5 is a schematic showing the contents of first and second Digital Elevation Models DEM1 and DEM2.

FIG. 4 shows a method 30 according to one embodiment of the invention in which data from the two types of techniques are directly compared. In step 32 a plurality of photographs are taken of an area of terrain to create a stereo-vision or parallax rendering of the terrain. In step 34 a first Digital Elevation Model DEM1 of the terrain is created from this parallax photogrammetric rendering. Separately, in step 36 a second Digital Elevation Model DEM2 of the terrain is created using information derived from remote sensing scans such as IFSAR or LIDAR. As shown in FIG. 5, each of DEM1 and DEM2 may be expressed as a two-dimensional array, each element of which containing values representing the longitude (a), latitude (b), and elevation (c) of each of a plurality of frames, tiles, points, or other sub-units of the terrain. For each terrain sub-unit, in step 38 corresponding elements of the first and second DEMs are compared to each other to discover anomalies in the data. If the resolution or sample spacing of the data is different in the two DEMs, interpolation of the data from one of the DEMs (step 40) may be required to accurately compare the characteristics of each terrain sub-unit.

FIG. 6 depicts a method 50 according to another embodiment of the invention in which orthorectified images of the terrain are compared. An orthorectified image is one in which each element of the image is referenced to a three-dimensional ground standard and a DEM such that each element is placed in its proper orthographic location. In step 52 a first DEM of an area of terrain is constructed from data obtained using a remote sensing technology such as IFSAR or LIDAR. In step 54 the first DEM is used to produce a synthetic or pseudo-photograph of the area of terrain. In step 56 a second DEM is generated from a parallax- or stereo-pair of photographs are taken from an airborne platform. In step 58 the second DEM is used to orthorectify one of the pair of photographs using known orthorectification techniques. In step 60 the first DEM, produced by a remote sensing technology, is used to orthorectify the pseudo-photograph. In step 62 the orthorectified photograph and pseudo-photograph are then compared to discover significant terrain features or obstacles that are missing from the database as previously explained.

Figure 7:
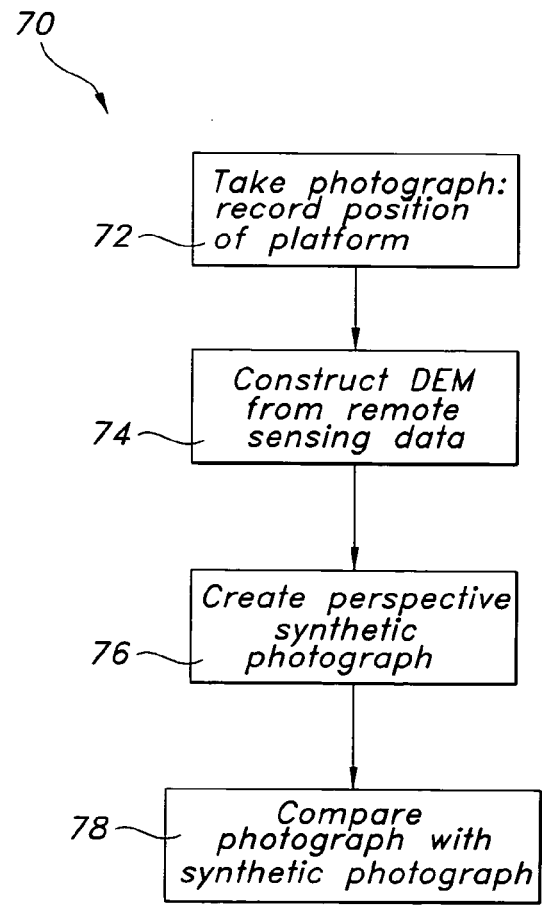
FIG. 7 is a flowchart showing a method according to another embodiment of the invention.
Figure 8:
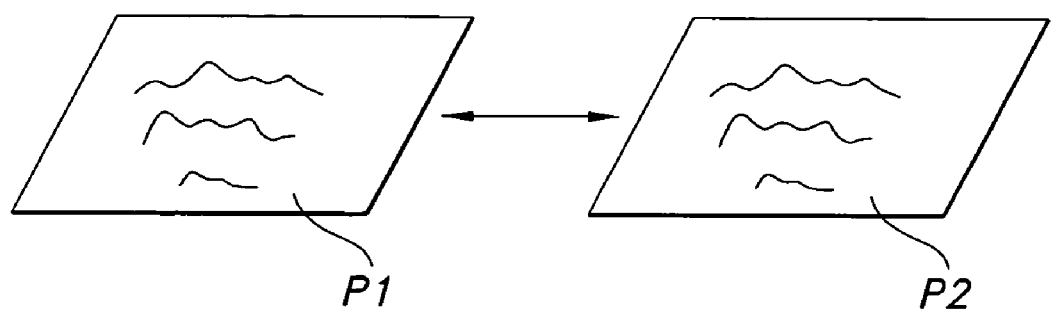
FIG. 8 is a perspective view of a photograph and a synthetic photograph according to another embodiment of the invention.

FIG. 7 depicts another method 70 according to another embodiment of the invention in which perspective images of the terrain are compared to discover errors in the data from which the images have been derived. In step 72 a photograph of an area of terrain is taken such as that represented at P1 in FIG. 8. The latitude, longitude, and altitude of the airborne platform must be recorded when the airborne photograph is taken. In step 74 a DEM of the area of terrain is constructed from data obtained using a remote sensing technology. In step 76, the latitude, longitude and altitude of the airborne platform is incorporated with the data in the DEM to render a perspective synthetic photograph P2 (FIG. 8) of the area of terrain with the same point of view as the photograph. In step 78 the photograph and the perspective synthetic photograph are compared to discover significant terrain features or obstacles that are missing from the database as previously explained.

Figure 9:
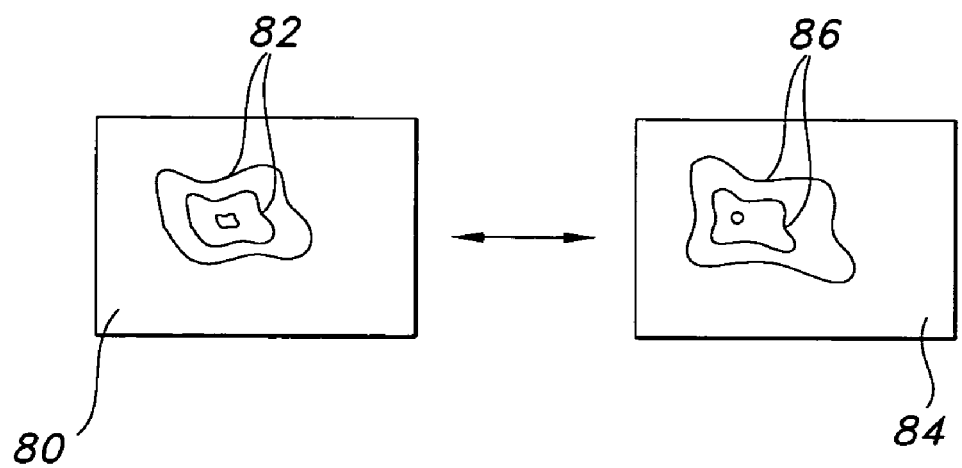
FIG. 9 is a top plan view of two topographical maps according to yet another embodiment of the invention.

Other comparison techniques may be used as well. For example, Digital Elevation Models produced by photogrammetry and remote sensing can both be converted into two-dimensional topographic maps. As shown in FIG. 9, a first topographical map 80, derived from a DEM produced by photogrammetry techniques, includes contour lines 82 representing points of constant elevation in the terrain. A second topographical map 84, derived from a DEM produced by remote sensing techniques, includes contour lines 86 representing points of constant elevation in the terrain. The contour lines on the two maps can be compared, either by a processor such as processor 12 or by other means, to discover significant terrain features or obstacles that are missing as previously explained.

Throughout this disclosure the comparison of the two sets of data has been described as being performed by a processor such as processor 12 using digital image processing techniques. However, such comparison may, in certain circumstances, be alternatively be performed manually by a trained examiner.

An advantage of the invention is that significant errors or omissions in a terrain database can be identified using data obtained using a different type of technology. Because the errors characteristic of each type of technology (i.e., photogrammetry and remote sensing) are somewhat predictable and do not tend to occur in the other technology, a terrain database can be corrected of such errors and omissions with a good degree of confidence.

Another advantage of the invention is that the data from the technologies can be presented in a variety of ways, such as topographically, photographically, or mathematically. This flexibility in data presentation permits the data to be compared using a wide variety of data comparison methods.

Still another advantage of the invention is that errors in terrain databases can be discovered relatively inexpensively. Aerial or satellite-based terrain photographs are readily available or can be obtained for a reasonable cost.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of identifying and correcting errors in information describing terrain features, comprising:
   obtaining a first set of data describing an area of terrain, the first set of data having a first type of error;
   obtaining a second set of data describing the area of terrain, the second set of data having a second type of error, wherein the second type of error is characteristically different from the first type of error;
   comparing a subset of the first set of data corresponding to a first portion of the area of terrain with a subset of the second set of data corresponding to the first portion to identify information, describing a terrain feature, that is not present in one of the first and second sets of data;
   replacing the subset of the first set of data with the subset of the second set of data when information describing a terrain feature is not present in the first set of data because of the first type of error; and
   replacing the subset of the second set of data with the subset of the first set of data when information describing a terrain feature is not present in the second set of data because of the second type of error.

2. The method of claim 1, wherein the obtaining the first set of data is accomplished using photogrammetry.

3. The method of claim 2, further including:
   generating an elevation model of the area using the second set of data;
   rendering a synthetic display of the terrain from the elevation model; and
   wherein the comparing step includes comparing the synthetic display of the terrain to a photogrammatic output of the first set of data to discover differences therebetween.

4. The method of claim 3, wherein the first set of data is a photograph of the terrain taken from a known position, and wherein the step of rendering the synthetic display of the terrain includes rendering the synthetic display of the terrain from a point of view of the known position.

5. The method of claim 2, wherein the first set of data comprises at least two photographs of the terrain taken at different positions, and further comprising:
   creating a first elevation model from the at least two photographs;
   orthorectifying one of the at least two photographs using the first elevation model;

creating a second elevation model using the second set of data;

rendering a display of the second elevation model;

orthorectifying the display of the second elevation model using the second elevation model; and wherein the comparing step includes comparing the orthorectified photograph with the orthorectified display of the second elevation model.

6. The method of claim 2, further including:

generating a first elevation model of the area of terrain using the first set of data; and generating a second elevation model of the area of terrain using the second set of data;

wherein the comparing step includes comparing a subset of the first elevation model corresponding to the portion of the area of terrain with a subset of the second elevation model corresponding to the portion of the area of terrain.

7. The method of claim 6, further including:

generating a first topographical display of the terrain from the first elevation model; and generating a second topographical display of the terrain from the second elevation model;

wherein the comparing step Includes comparing positions of lines of constant altitudes on the first and second topographical displays to discover differences therebetween.

8. The method of claim 1, wherein the obtaining the second set of data is accomplished using active remote sensing technology.

9. The method of claim 8, wherein the active remote sensing technology is one of Interferometric Synthetic Aperture Radar (IFSAR) and Light Detection and Ranging (LIDAR).

10. A method of identifying and correcting errors in a database containing information descriptive of terrain, the information being obtained by scanning the terrain using a remote sensing technology, the method comprising:

obtaining a data set that is descriptive of the terrain and is independent of the information in the database, wherein the data set has a characteristic error type that is different from a characteristic error type of the remote sensing technology;

comparing the data set to the information in the database;

identifying errors in the database by determining whether information in the database describing a terrain feature is different from information in the data set describing the terrain feature; and replacing the information in the database describing the terrain feature with the information from data set describing the terrain feature when the difference therebetween is due to the characteristic error type of the remote sensing technology.

11. The method of claim 10, wherein the data set is obtained through photogrammetry.

12. The method of claim 11, further including:

generating an elevation model of the area using the information in the database;

rendering a synthetic display of the terrain from the elevation model; and wherein the comparing step includes comparing the synthetic display of the terrain to a photogrammetric output of the data set to discover differences therebetween.

13. The method of claim 12, wherein the data set is a photograph of the terrain taken from a known position, and wherein the step of rendering the synthetic display of the terrain includes rendering the synthetic display of the terrain from a point of view of the known position.

14. The method of claim 11, wherein the data set comprises at least two photographs of the terrain taken at different positions, and further comprising:

creating a first elevation model from the at least two photographs;

orthorectifying one of the at least two photographs using the first elevation model;

creating a second elevation model using the information in the database;

rendering a display of the second elevation model;

orthorectifying the display of the second elevation model using the second elevation model; and wherein the comparing step includes comparing the orthorectified photograph with the orthorectified display of the second elevation model.

15. The method of claim 11, further including:

generating a first elevation model of the area of terrain using the data set; and generating a second elevation model of the area of terrain using the information in the database;

wherein the comparing step includes comparing the first elevation model with the second elevation model.

16. The method of claim 15, further including:

generating a first topographical display of the terrain from the first elevation model; and generating a second topographical display of the terrain from the second elevation model;

wherein the comparing step includes comparing positions of lines of constant altitudes on the first and second topographical displays to discover differences therebetween.

17. The method of claim 10, wherein the identifying step includes:

Identifying obstacles and terrain features in the data set that are not accurately represented in the information in the database.

18. A method of Identifying and correcting errors in a database containing information descriptive of terrain, the information being obtained by scanning the terrain using a remote sensing technology, the method comprising:

obtaining, using photogrammetry, a data set that is descriptive of the terrain and is independent of the information in the database, wherein the data set has a characteristic error type that is different from a characteristic error type of the remote sensing technology;

comparing the data set to the information in the database;

identifying obstacles and terrain features in the data set that are not accurately represented in the information in the database; and replacing the information in the database relating to the inaccurately represented obstacles and terrain features with information in the data set relating to the inaccurately represented information when the inaccurate representation is due to the characteristic error type of the remote sensing technology.

19. The method of claim 18, further including:

generating a first elevation model of the area of terrain using the data set; and generating a second elevation model of the area of terrain using the information in the database;

wherein the comparing step includes comparing the first elevation model with the second elevation model.

20. The method of claim 18, further including:

generating an elevation model of the area using the information in the database;

rendering a synthetic display of the terrain from the elevation model; and wherein the comparing step includes comparing the synthetic display of the terrain to a photogrammetric output of the data set.

* * * * *